Aug. 28, 1956 E. M. BARBER 2,760,471
INTERNAL COMBUSTION ENGINE AND METHOD OF OPERATION
Filed May 6, 1953 2 Sheets-Sheet 1

United States Patent Office 2,760,471
Patented Aug. 28, 1956

2,760,471

INTERNAL COMBUSTION ENGINE AND METHOD OF OPERATION

Everett M. Barber, Wappingers Falls, N. Y., assignor to The Texas Company, New York, N. Y., a corporation of Delaware Application May 6, 1953, Serial No. 353,406

1 Claim. (Cl. 123—119)

This invention relates to reciprocating piston internal combustion engines and methods of operating them. More particularly the invention relates to a method for reducing the lean limit of ignition in premixed charge Otto cycle engines. By "premixed charge," as used herein throughout the specification and claim, it will be understood is meant not only a carbureted charge, but also that charge in engines employing fuel injection into the intake manifold or directly into the cylinder and wherein injection occurs mainly during the suction stroke or is complete at the time of intake valve closing in the early part of the piston compression stroke. This distinguishes from engines operating with cylinder injection during the latter part of the compression stroke such as the Hesselman engine or the engine of my Patent No. 2,484,009.

The fuel-air weight ratio operating range for Otto cycle engines which employ spark ignition is from .06 to .12, with the lean and rich limits being determined by the ratios at which misfire occurs. A fuel-air ratio of .065 is accepted as the lean limit for practical purposes so as to provide a safety factor against misfire. It is desirable to operate internal combustion engines at leaner fuel-air ratios because the thermal efficiency can be increased as fuel-air ratio becomes leaner, engine temperature is reduced materially, specific fuel consumption is decreased, and the octane requirement of the engine is reduced.

It is an object of the present invention to provide a method of operating premixed charged internal combustion engines at mixture strengths substantially leaner than the lean limit of ignition in conventional engine operation.

Another object is to provide a method for decreasing the lean limit of ignition of premixed charge internal combustion engines.

Another object is to provide a method of operating premixed charge internal combustion engines with substantially improved fuel economy, without increasing octane requirement.

These and other objects and advantages of the invention will be apparent from the following description taken in connection with the accompanying drawings wherein.

Briefly, the present invention resides in the discovery that a substantial reduction in the lean limit of ignition of a premixed charge Otto cycle engine results if the combustible mixture in the engine is caused to swirl rapidly about the engine cylinder, so as to move rapidly through the ignition source during the time that this source has incendiary power in the combustion cycle. For such operation the ignition source should be so located in the path of the moving mixture that a substantial portion of the combustible mixture passes in close proximity to the ignition source. It has also been found that with engine operation in this manner with leaner mixture, proper coordination of ignition timing permits engine operation to be attained at mixtures lean enough to produce better fuel economy than that attainable when operating at the conventional "maximum economy" point.

Figure 1:
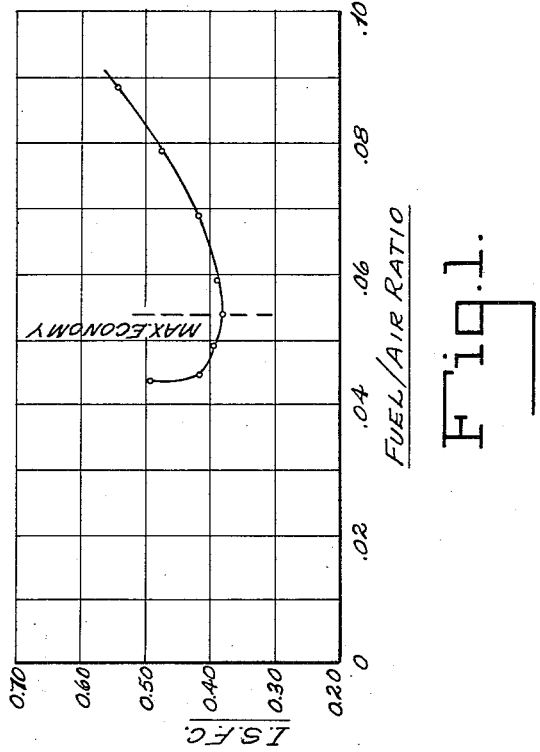
Fig. 1 is a graph of the conventional variation of specific fuel consumption with mixture strength.

The "maximum economy" mixture strength is defined, in accordance with conventional prior art practice, as that which produces minimum specific fuel consumption at the ignition timing which is conventionally known as "optimum," that is the ignition timing which provides maximum power at maximum power mixture strength. With this "optimum" ignition timing, when mixture strength is decreased, in prior art engine operation specific fuel consumption first diminishes and then increases, passing through a minimum value which, as stated above, denotes the "maximum economy" point. This variation of specific fuel consumption with mixture strength is shown in Fig. 1 of the drawing. In accordance with this conventional concept, in prior art engine operation there is no desire to operate at mixtures leaner than that for "maximum economy," and, since the accepted lean limit is already below the "maximum economy" mixture strength, there is little incentive to reduce the lean limit of spark ignition.

In accordance with the present invention, however, if the mixture strength is reduced, in the presence of adequate air swirl and with properly coordinated ignition timing, engine operation can be obtained at specific fuel consumptions substantially below that corresponding to the conventional "maximum economy" level, as the mixture strength is decreased. Adjustment of the ignition timing is necessary because leaner mixtures require a longer time to burn, and thus the beginning of burning should be timed further in advance of top dead center than with richer mixtures. Thus there comes to be an important incentive to be able to ignite leaner mixtures.

The advantages thus obtained by engine operation in accordance with the present invention are believed to result from an increase in the volume of combustible mixture inflamed by the ignition source due to the movement of the combustible mixture through and past it, as compared to the volume that would have been inflamed had there been no orderly motion of the mixture through the ignition source. Increasing the volume initially inflamed decreases the heat content of the mixture required to support a self-propagating flame. The decrease in heat content required thus enables operation down to a lower lean limit of misfire.

Engine operation in accordance with the present invention will now be described with particular reference to the engine illustrated in Fig. 2. This engine is a CFR type provided with a standard F-4 cylinder. In this engine a piston 10 reciprocates in a cylinder 12. An intake port 14 is provided for introducing a combustible mixture of fuel and oxidizing gas into the cylinder, and the poppet valve 16, which is provided with a semi-circular shroud 17, serves to open and close the intake port. A port 18 is provided for the exhaust gases, and a conventional poppet valve 20 is provided for opening and closing this port. A spark plug 22 is located in the wall of the cylinder, having electrodes protruding into the combustion space of the cylinder so as to be swept by the swirling gas mixture. While shown in Fig. 3 as located about 270° downstream from the gas inlet valve 16, the spark plug can be positioned at any suitable location so that the electrodes 23 are exposed to the swirling mixture in the combustion space. Preferably the plug is located about 90 to 350° downstream from the gas inlet so as not to be in the direct path of the incoming gas charge from valve 16. This prevents undue cooling of electrodes 23 with resultant carbon deposition thereon.

A supercharger 24 is provided so that the operation of the engine at various intake manifold pressures may be ascertained. A carburetor 26, located adjacent an air intake port 28, serves to provide fuel which mixes with the air to form a combustible mixture. A conventional throttle 30 serves to control the intake of the supercharger.

In operation, the fuel-air ratio of the combustible mixture is controlled by adjusting the carburetor 26 and the throttle 30, and the intake manifold pressure is controlled by the supercharger 24. During each combustion cycle the valve 16 opens to permit the combustible mixture to be drawn into the combustion space above the piston, as illustrated in Fig. 2. The shroud 17 on the valve 16 causes the combustible mixture to swirl or rotate around the axis of the cylinder 12 in the direction indicated by the arrow 32, as shown in Fig. 3.

After the piston 10 moves beyond the bottom dead center position, the valve 16 closes. The combustible mixture continues its swirling movement around the axis of cylinder 12 during the compression stroke, and during the latter part of the compression stroke a spark of finite duration is provided at electrodes 23 of spark plug 22. During the existence of incendiary power of this spark, the swirling mass of combustible mixture passing adjacent and between electrodes 23 of the spark plug is ignited, the volume of burning being extended due to the fact that a substantial portion of the combustible mixture passes in close proximity to spark plug 22 while the spark is at igniting effectiveness. Since the initial volume of the swirling combustible mixture ignited by the spark plug is larger than the initial volume of relatively stationary combustible mixture ignited in conventional engines, it may be seen that causing the combustible mixture to swirl past the spark plug serves not only to extend the lean limit of ignition, but also increases the combustion rate.

Figure 2:
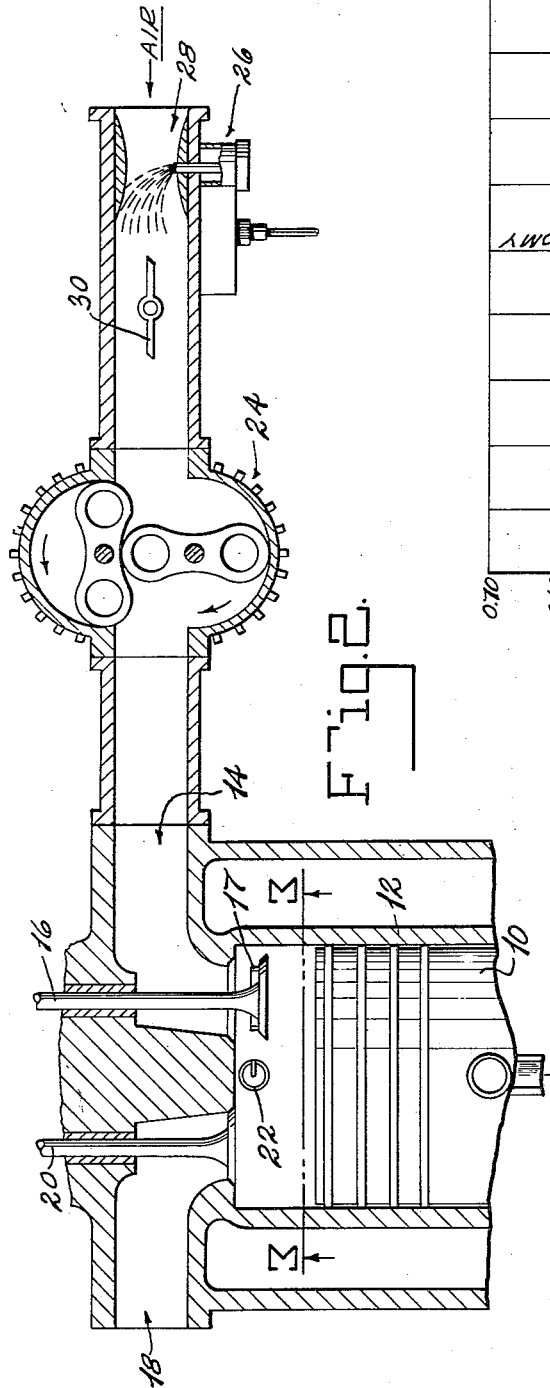
Fig. 2 is a sectional view of an engine for carrying out my improved method of operating an internal combustion engine.
Figure 3:
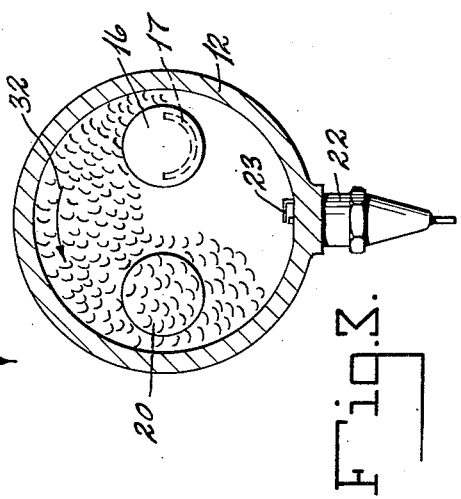
Fig. 3 is a sectional view along line 3—3 of Fig. 2.
Figure 4:
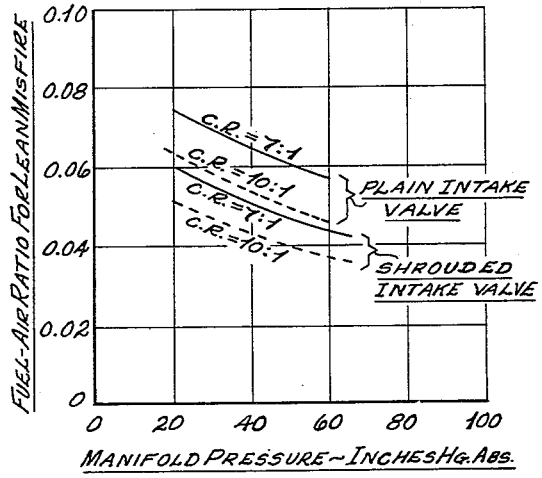
Fig. 4 is a graph of lean misfire mixture strength vs. manifold pressure, for two different compression ratios, as determined both with and without a rapid swirling movement of the charge.

The present invention resides in the discovery that with an appropriate amount of motion of the mixture through and past the ignition source, as illustrated by Figs. 2 and 3, the mixture strength for lean misfire can be reduced to about 80 per cent of the lean misfire mixture strength of the usual case in which the mixture is not provided with such motion. This is illustrated by Fig. 4 which shows lean misfire mixture strength at each of two compression ratios and over a range of manifold pressure, as determined both with an unshrouded valve, and with a valve 16 having a shroud 17 providing a swirl rate of the charge of six times engine R. P. M. at 1800 R. P. M.

The data from which the curves of Fig. 4 were plotted is shown below, in Table I, to illustrate that the resulting reduction of lean misfire mixture strength is essentially a constant percentage independent of compression ratio or manifold pressure.

| Comp. Ratio | Man. Press. | Misfire F/A Unshrouded Valve | Shrouded Valve | Ratio: Shrouded/Unshrouded |
| --- | --- | --- | --- | --- |
| 7 | 20 | 0.73 | 0.060 | 0.82 |
|   | 30 | 0.67 | 0.055 | 0.82 |
|   | 40 | 0.62 | 0.050 | 0.81 |
|   | 50 | 0.57 | 0.047 | 0.82 |
|   | 60 | 0.54 | 0.043 | 0.79 |
| 10 | 20 | 0.063 | 0.052 | 0.82 |
|   | 30 | 0.058 | 0.048 | 0.83 |
|   | 40 | 0.054 | 0.044 | 0.81 |
|   | 50 | 0.049 | 0.041 | 0.83 |
|   | 60 | 0.046 | 0.038 | 0.82 |

To produce this effect the swirl rate during the compression stroke and at the time of ignition should be at least three times the speed of the engine in R. P. M., and preferably up to about six times engine R. P. M. The size, shape and location of the port 14, valve 16 and shroud 17 of Figs. 2 and 3 may be arranged to provide various swirl rates as desired. Also the combustible mixture may be introduced through ports into the wall of cylinder 12 which are inclined to provide the desired swirling action, or the latter may be used in combination with a shrouded valve. So that a substantial amount of the swirling mass of combustible mixture inside the cylinder can pass through the electrodes 23 of spark plug 22, these electrodes should preferably extend from the end of the plug so that they are well exposed. Also spark plug 22 should be located so that electrodes 23 are not recessed in the cylinder or in the cylinder head, but rather extend inside the circumferential wall of cylinder 12. The electrodes 23 should extend from ⅛ to ½ inch into the combustion space, and preferably about ¼ of an inch, so as to penetrate beyond the boundary layer of more stagnant mixture immediately adjacent the cylinder wall. The ignition system associated with spark plug 22 should produce a spark having finite duration of incendiary power, preferably about .001 second.

Figure 5:
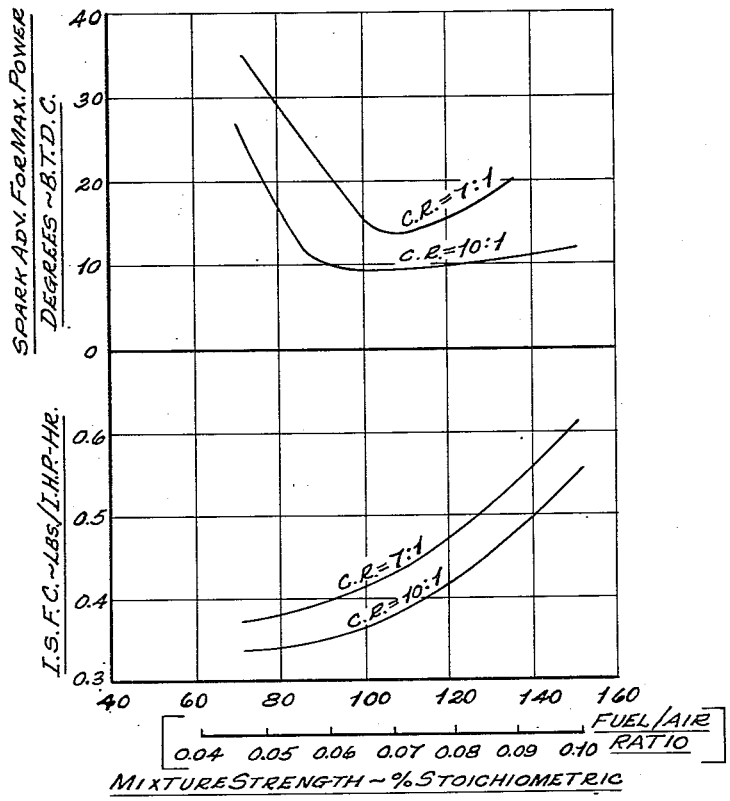
Fig. 5 is a graph of the variation of spark advance required for maximum power, and of the resulting variation in specific fuel consumption, as a function of mixture strength, for engine operation at different compression ratios.

As explained heretofore, minimum specific fuel consumption is obtained, when operating at the leaner mixture strengths made possible with adequate air swirl, by correlating ignition timing with mixture strength. Fig. 5 illustrates both the variation of spark advance with mixture strength, which is necessary for maximum power output, and also the resulting reduction of specific fuel consumption with mixture strength, both curves being determined in the presence of sufficient air swirl to permit the ignition of lean mixtures. As will be apparent from Fig. 5, a reduction in mixture strength from 1.0 stoichiometric to 0.8 stoichiometric requires a related adjustment in spark advance of 5 to 15 degrees.

If a fuel-air ratio of .065 is accepted as the average lean limit for conventional prior art engines, it will be noted from the table above that with an engine arranged for operation as previously described there is effected an average reduction of the lean misfire fuel-air ratio to .80×0.65=0.52. Returning again to Fig. 5, it will be noted that such a reduction in fuel-air ratio will produce almost as great a reduction of indicated specific fuel consumption as an increase in the compression ratio from 7:1 to 10:1 at the original mixture strength. Moreover, a reduction of indicated specific fuel consumption by reduction of fuel-air ratio at constant compression ratio does not require an increase in octane requirement of the fuel; whereas such octane requirement increase is required when the reduction in specific fuel consumption is attained by increased compression ratio in conventional engines.

The fuel which is employed in the engine also affects the limiting fuel air ratio for lean misfire, because the critical or limiting volume for self-propagating combustion depends upon the heat content, i. e. carbon to hydrogen ratio, of the fuel, as well as the mixture strength, temperature, and density of the mixture. If, however, mixture strength is defined in terms of percentage of stoichiometric fuel-air ratio, rather than in terms of fuel-air ratio, the limiting mixture strength for lean misfire is substantially the same for various fuels suitable for premixing and spark ignition, regardless of their carbon to hydrogen ratio. At any rate engine operation in the manner above described produces a substantial reduction in lean misfire mixture strength, whether expressed in terms of fuel-air ratio for any given fuel, or whether expressed in terms of percentage of stoichiometric fuel-air ratio for various fuels.

Thus while it has been found that benzene, iso-octane, and iso-pentane, for example, produce respectively leaner fuel-air ratios for lean misfire, these three different fuels have lean misfire mixture strengths which, when expressed in terms of percentage of stoichiometric fuel-air ratio, are substantially equal. With the engine illustrated in the drawings operated in the manner above described so as to cause a combustible mixture of iso-pentane and air to swirl around the interior of the cylinder at a rate of about six times the speed of the engine in R. P. M. during the combustion cycle, the minimum fuel air ratio for lean misfire was lowered to .039, or 60 per cent of stoichometric, as compared with a lean misfire limit of .055 fuel-air ratio, or 85 percent of stoichiometric, with conventional engine operation.

Although the engine shown in the drawings is provided with a spark plug located in the wall of the cylinder, it will be apparent that the ignition means may be located adjacent the outer portion of the cylinder head if desired. With such an arrangement a substantial portion of the combustible mixture in the cylinder moves past the ignition means just as in the arrangement shown in Figs. 2 and 3. It will be understood that the expression "spark ignition" as used herein is used in a broad sense as including the various known forms of positive ignition having a finite duration of incendiary power, as distinguished from compression or glow plug ignition.

The super-charger of Fig. 2 is shown for the purpose of explaining the various factors which affect the lean limit of ignition in an engine. It will be apparent that a supercharger is not required and that a conventional intake manifold and carburetion system may be employed, as in an automotive engine.

Thus there has been shown and described a method of engine operation which provides a substantial reduction in the lean mixture strength limit of ignition, and, by proper coordination of ignition timing with reduced mixture strengths thus attainable, provides a substantial improvement in fuel economy, without requiring any increase in octane requirement.

Obviously many modifications and variations of the invention, as hereinbefore set forth, may be made without departing from the spirit and scope thereof, and therefore only such limitations should be imposed as are indicated in the appended claim.

I claim:

In a method of lowering the lean limit of ignition in a premixed charge, spark ignition, Otto-cycle reciprocating piston engine, the steps including introducing a premixed combustible fuel/air charge of below 0.06 but above 0.038 fuel/air weight ratio at a charge density within the range of 20–60 inches of mercury absolute manifold pressure into an engine cylinder in a manner to produce a high velocity swirl of said charge in said cylinder at the time of intake valve closing, compressing said charge to a compression ratio of between 7:1 and 10:1 at top center of the piston compression stroke, the high velocity swirl being maintained during compression to provide a swirl within the range of 3–6 times engine speed at the time of ignition in the latter part of said piston compression stroke, and correlating the spark advance with the fuel/air weight ratio, the swirl rate, the compression ratio and the charge density, coupled with producing a spark in the outer circumferential portion of the swirling charge to effect ignition without misfire of the compressed swirling charge and with efficient Otto-cycle combustion thereof without further addition of fuel thereto, said spark advance being from 2 to 4 crank angle degrees in excess of optimum maximum power ignition advance for each 10 per cent decrease from maximum power charge strength and for a fuel/air weight ratio of 0.045 ranging from more than 25° to about 35° before piston top dead center.

References Cited in the file of this patent

UNITED STATES PATENTS

| | | |
|---|---|---|
| 2,029,581 | Merriam | Feb. 4, 1936 |
| 2,086,427 | Mock | July 6, 1937 |
| 2,109,298 | Mock | Feb. 22, 1938 |
| 2,191,746 | Barkeij | Feb. 27, 1940 |

FOREIGN PATENTS

| | | |
|---|---|---|
| 607,929 | Great Britain | Sept. 7, 1948 |